Dec. 20, 1960  A. S. LINDSEY ET AL  2,964,972
BALANCES FOR ROTATING ENGINE ASSEMBLIES
Filed July 10, 1958  2 Sheets-Sheet 1

INVENTORS
A. S. LINDSEY
D. E. JAMESON
BY: Maybee & Legris
ATTORNEYS

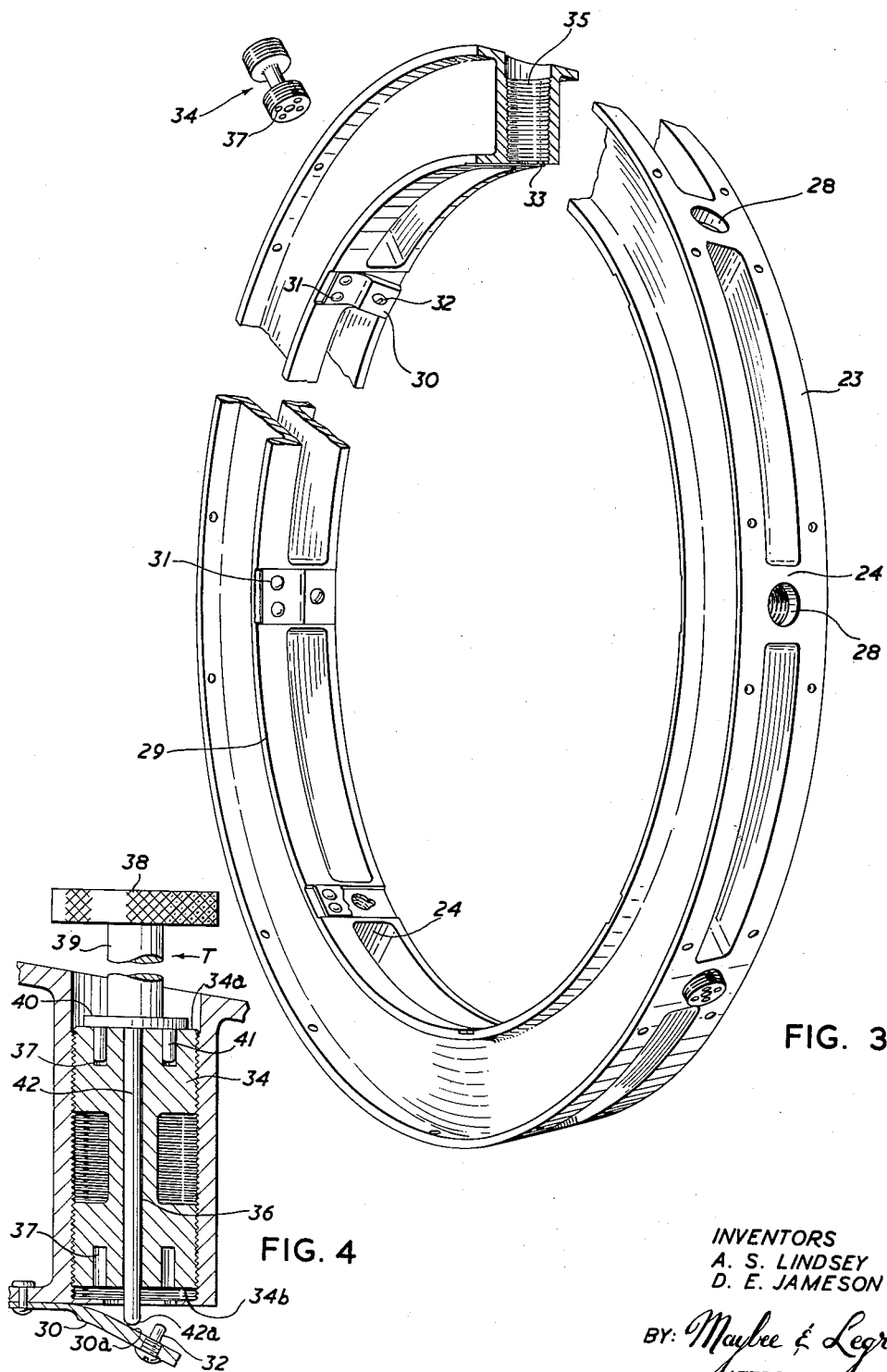

United States Patent Office 2,964,972
Patented Dec. 20, 1960

2,964,972

BALANCES FOR ROTATING ENGINE ASSEMBLIES

Albert Sherman Lindsey, Port Credit, Ontario, and Donald Eric Jameson, Rexdale, Etobicoke, Ontario, Canada, assignors to Orenda Engines Limited, Malton, Ontario Canada, a corporation of Canada Filed July 10, 1958, Ser. No. 747,617

5 Claims. (Cl. 74—573)

This invention relates to balancing devices and, in particular, to a device to enable the rotor of a gas turbine engine to be accurately balanced.

At the present time it is the practice of manufacturers of gas turbine engines to balance the rotor assemblies prior to the actual building of the engine. This balance is achieved in various ways, for example, by the addition of special weights designed to fit on bolts or in grooves, or by grinding material from specified sections on the rotor. Due to the subsequent operations of assembling the engine, there is often a need for further balancing of the rotating parts when the engine is completed. Further balance adjustment is normally not possible due to the inaccessibility of the rotating parts and, quite frequently, the unbalance is so severe that it is necessary to strip the engine for rebalancing.

It is an object of the present invention to provide a balancing assembly for the rotors of gas turbine engines which will enable the rotors to be balanced accurately and simply and which will permit final adjustment after the engine has been completely assembled.

A preferred embodiment of the invention is illustrated in the accompanying drawings in which like parts are indicated by like reference numerals in the various views and in which:

Figure 3 is a perspective view of the balancing assembly partly broken away and partly exploded, and Figure 4 is a side elevation view in axial cross-section of one of the balancing weights and of a tool specifically designed to be used in association with this invention.

Figure 1:
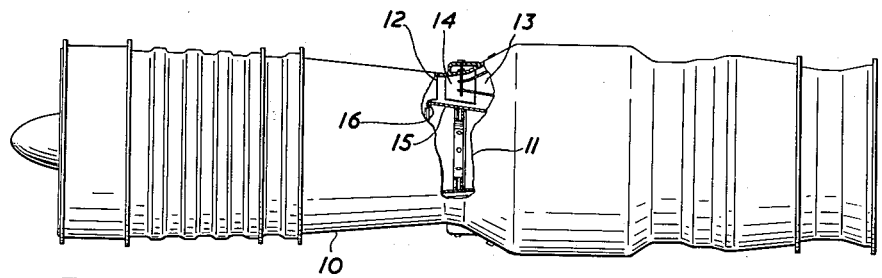
Figure 1 is an axial view of a gas turbine engine with a portion cut away to show the location of the balancing assembly.

Referring now to Figure 1 a gas turbine engine 10 is shown in general outline, the skin being broken away at 11 to show a small portion of the internal construction. In the cut-away portion the compressor outlet 12 is shown leading to the combustion chamber 13 through the guide vanes 14 which support the forward edge of the combustion chamber 13. Radially inside the guide vanes 14 is the outer drum 15 of the rotor which, as seen in Figure 1, is conical in section and which, in the embodiment shown, is provided at 16 with a radially inwardly extending flange by means of which this portion of the rotor 15 may be secured to that portion of the rotor which extends forwardly of the cut-away portion 11.

Figure 2:
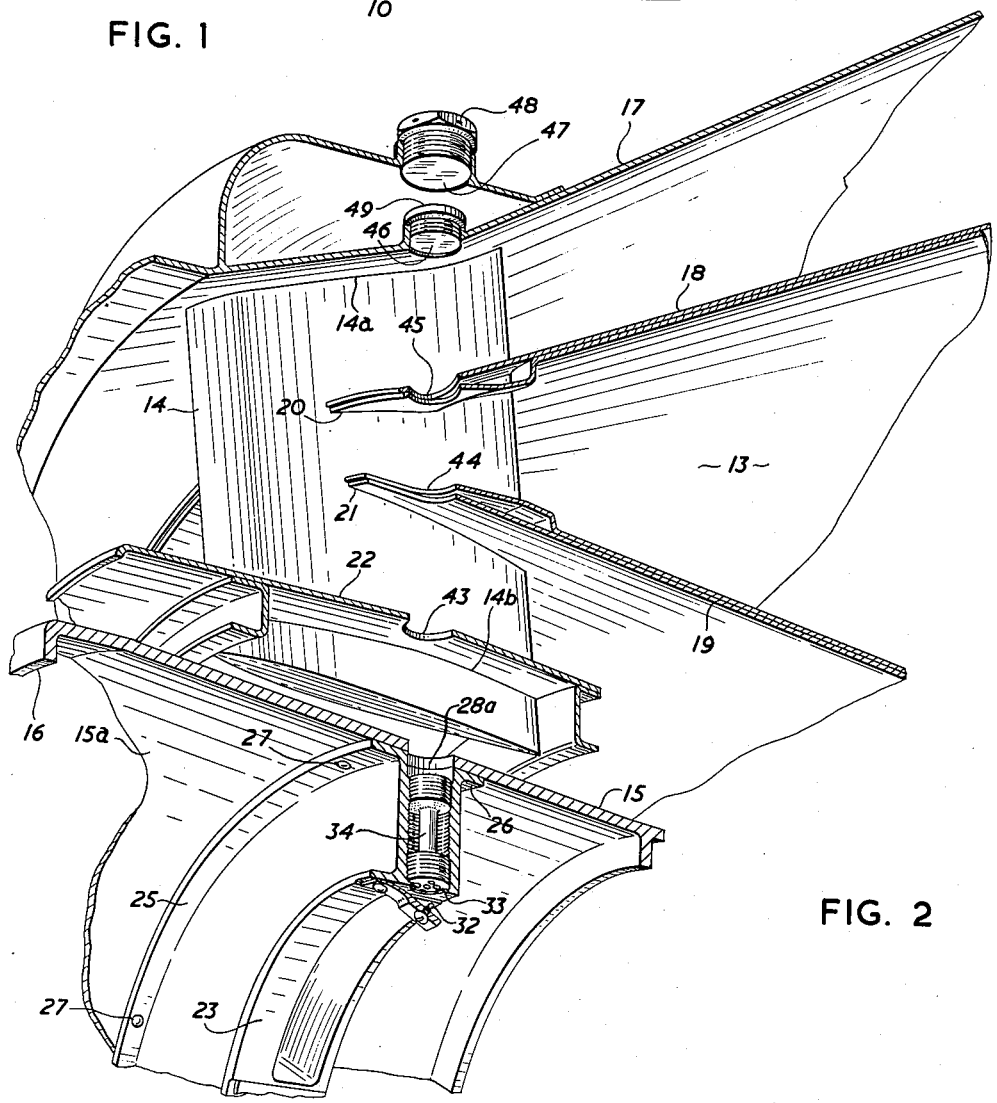
Figure 2 is a perspective view in section of part of the cut-away portion of Figure 1.

Referring now to Figure 2 the portion disclosed in the cut-away part of Figure 1 may be seen in greater detail. The external skin 17 of the engine surrounds the outer skin 18 of the combustion chamber 13 which, in addition, is provided with an inner skin 19, the combustion chamber 13 lying in that annular portion defined on the outside by skin 18 and, on the inside, by skin 19. The forward edges 20 and 21 of skins 18 and 19 are supported on guide vane 14 which, at its radially outer end 14a is secured to the outer skin 17 of the engine and which, at its inner end 14b is secured to a shroud skin 22 which, in conjunction with the outer skin 17 defines, at this point, the outlet passage of the compressor which is not seen in the drawings.

The rotor 14 as described above is frusto-conical in section and, at 16, is provided with a radially inwardly extending flange. The purpose of the flange 16 is to enable this portion 15 of the rotor to be secured to that portion thereof which extends forwardly of the portion shown in Figure 2. Mounted on the inner surface 15a of the rotor 15 is an annular member 23 which, as seen in Figures 2 and 3 comprises a pair of annular members secured together at equally spaced points about their periphery by means of integrally formed webs 24 and provided, at their radially outer edges with flanges 25 and 26 through which holes are drilled co-operating with equivalent holes in the rotor 15 so that the annular member 23 may be secured to the internal surface 15a of the rotor 15 by means such as rivets 27. The external diameter of the annular member 23 must be at least very slightly smaller than the internal diameter of flange 16 so that the member 23 may be inserted in the rotor 15 from the forward edge of that portion shown in Figure 2 with sufficient clearance to pass the flange 16 and ultimately, due to the conical nature of the rotor 15, bear against its internal surface 15a as shown in Figure 2.

Referring now to Figure 3 each of the webs 24 joining the two rings which make up the annular member 23 is provided with an internally threaded radially aligned hole 28, the holes 28 being equal'y spaced about the periphery of the annular member 23 and co-axially aligned with holes 28a of the same size in the rotor 15. The radially inner edge of one of the two rings making up the annular member 23 is provided with an axially extending flange as shown at 29 in Figure 3 and to this flange 29 are secured, by means such as rivets, bolts, screws, welding or other suitable means spring members 30 which lie across the radially inner ends of the holes 28 which, as seen at the sectioned portion of Figure 3, extend radially completely through the webs 24. In Figure 3 these spring members 30 are shown as being secured by means of rivets 31. Each spring member 30 is provided with a pin 32 which extends axially into each hole 28 parallel to but spaced from the longitudinal axis of the hole 28. For convenience and simplicity the spring members 30 are thinner at that portion adjacent the rivets 31 than at the portion lying over the open end of the holes 28 so that the portion carrying the pin 32 may be deflected radially inwardly to cause the pin 32 to move entirely out of the hole 28 as shown in Figure 2.

Each hole 28 is provided, adjacent its radially inner end, with an inwardly extending flange 33, the surface of each flange 33 remote from the axis of the rotor 15 lying on an imaginary circle concentric with the annular member 23 and, hence, concentric with the rotor 15. Each hole 28 is adapted to receive a balancing weight indicated by the reference character 34 the nature of which can best be seen from a consideration of Figure 4.

In Figure 4 the balancing weight may be seen to comprise a substantially cylindrical slug of material which is externally screw-threaded throughout its length to cooperate with the internal screw threads 35 in each hole 28 in the annular member 23. The balancing weight 34 is provided with an axial bore 36 which extends completely through the weight for a purpose which will become apparent as the description proceeds. Each end of the weight 34 is provided with a plurality of axially oriented drillings 37 which extend inward'y from each end for a distance at least equal to the length of pin 32 carried by the spring members 30. In the embodiment shown in the drawings there are four drillings 37 equally spaced about each end face of each weight 34, the drillings at the radially inner end of each weight being engageable by the pin 32 on the spring members 30 when they are in position. The drillings 37 at the radially outer end of each weight 34 serve a dual purpose which will be later described.

From a consideration of Figure 4 it will be apparent that the balancing weights 34 are symmetrical about their geometric centre which, accordingly, is the centre of gravity. As a result, when the weights 34 are threaded into the holes 28 in the annular member 23 and into abutment with flanges 33, the centres of gravity of all the weights 34 will lie on a single imaginary circle having its centre at the axis of rotation of the rotor 15 and the axis of the annular member 23.

In Figure 4 a special tool T is shown which is used for the insertion and removal of the weights 34 and can be seen to comprise a knurled hand wheel 38 by which the tool may be manipulated and which carries a shaft 39 extending axially from it. At the end of the shaft 39 remote from the hand wheel 38 there is provided a radially extending flange 40 which carries, on that face remote from the hand wheel 38 at least two and preferably four prongs 41 which, when the tool is in the position shown in Figure 4, extend into the four drillings 37 in the radially outer end of the weight 34. It will be seen, accordingly, that by rotating the hand wheel 38 the weight 34 may be rotated as well. Coaxial with the shaft 39 of the tool there is provided a slender shaft extension 42 which is of such a diameter that it slides easily through the central bore 36 in the weight 34 and this shaft 42 is of such a length that when the tool is inserted in the weight 34 so that flange 40 bears against the radially outer end 34a of the weight 34, the end 42a of the slender shaft 42 will bear against the surface 30a of the spring member 30 and deflect it radially inwardly so that the pin 32 will be removed from the holes 37 in in which it previously rested and thereby free the weight 34 for rotation in the hole 28.

When the weight 34 is to be inserted in its hole 28 it is applied to the tool in the manner shown in Figure 4 and threaded into the hole 28. As the weight 34 is threaded towards engagement with the stop member 33 in its hole 28, the end 42a of the shaft 42 will gradually deflect the spring member 30 away from its position closing the end of hole 28 until the weight 34 is firmly threaded into the hole in engagement with the stop 33. The tool 38 may then be withdrawn and the pin 32 will then, under the influence of the spring member 30, bear against the radially inner end 34b of the weight 34. If, by chance, the pin 32 is not in line with one of the plurality of drillings 37 in the end 34b of the weight 34, the weight 34 may be rotated by a distance which will not be in excess of one-eighth of a revolution until the pin 32 drops into one of the plurality of holes 37. In the embodiment shown in the drawings there are four holes 37 in each weight 34 but a larger number may be provided if space permits. It will be appreciated that the pitch of threads 35 in holes 28 is rather fine so that the rotation of the weight 34 through one-eighth of a revolution will not shift the weight 34 appreciably in an axial direction to move its centre of gravity off the imaginary circle referred to above.

Referring now once again to Figure 2 it will be seen that holes 43, 44, 45, 46 and 47 have been provided in members 22, 19, 18 and 17 respectively all of which holes are located with their centres lying on an extension of a radius of the rotor 15, and axially in line with the centres of the holes 28 in the annular member 23. Accordingly, the rotor 15 may be revolved to bring successively, each of the holes 28 and 28a in line with the series of holes 43 to 47 inclusive so that the tool indicated generally by the reference character T in Figure 4 may be inserted through these holes and into engagement with the weight 34 when the engine is in the entirely assembled condition. Suitable plugs 48 and 49 are provided to close holes 46 and 47 as may be seen in Figure 2 so that air from the compressor may not escape therethrough during operation of the engine. Holes 44 and 45 need not be plugged since the pressure is equal on both sides of members 18 and 19 at the point where the holes lie and hole 43 need not be plugged since it is not important to pressurize or keep free from pressure the area radially inside the shroud skin 22.

As can be seen in Figures 2, 3 and 4 the actual mass of each of the weights 34 may be adjusted by machining material from them symmetrically about the centre of gravity of the weights. In all probability it will be necessary to machine material from more than one weight in order to balance the engine. It will be appreciated that the calculations involved in balancing the engine will be materially simplified due to the fact that the weights all have their centres of gravity lying upon a circle which has its centre at the centre of rotation of the rotor which is to be balanced. As a result of machining material from the weights symmetrically about their centre of gravity, the centre of gravity of each weight will be unaffected by the machining operation and, for the purposes of subsequent calculation, the radius of gyration of the mass to be balanced will remain constant. Accordingly, only one variable is introduced into the calculations, namely the variable weight which will be inserted in the holes 28. In prior constructions which involve weights which could be threaded into radially aligned holes, it was the practice to balance the rotating mass by advancing or retracting each weight in its threaded aperture to achieve balance. This was a rather difficult procedure to accomplish due to the fact that an additional variable was introduced into the calculations, namely the varying radius of gyration.

The provision of holes 37 at both ends of the weight 34 maintains the symmetry of the weight about any plane containing its centre of gravity and, accordingly, this means of coupling a tool to the weight was chosen although other means would be suitable from a mechanical point of view. It may be that in some engine designs it will be desirable to provide different means for coupling a tool to the weight and this may be done within the scope of this invention.

From the above description it is believed to be evident that a simple, accurate and economical balancing assembly has been provided for use with the rotors of gas turbine engines which provides for an extremely accurate balancing of the rotating assembly while providing for accessibility of the balancing assembly from the outside of the engine after the engine has been assembled. The balancing assembly will not add materially to the weight of the engine and means have been provided embodied in the spring members 30 and the pins 32 for ensuring that displacement of the weights may not accidentally take place so that balance is maintained throughout engine operation once it has been achieved.

While a preferred embodiment of the invention has been disclosed minor modifications of the precise structure disclosed are contemplated within the scope of the appended claims.

What we claim as our invention is:

1. A balancing assembly for the rotor of a gas turbine engine comprising an annular member adapted to be secured to the rotor concentrically therewith, the annular member being provided with a plurality of equally spaced, radially aligned and internally threaded holes about its periphery, stop means at the radially inner end of each hole, a plurality of balancing weights, one weight adapted to be threadably received in each hole, each balancing weight having an end portion adapted to engage said stop means at the radially inner end of each hole, each weight being so shaped that, although not of identical weight, the centre of gravity of each weight is at a constant distance from the said end portion of each weight so that when each weight is threadably engaged in its hole with its end portion in engagement with the said stop means, the centre of gravity of each weight will be located on one imaginary circle concentric with the rotor and means associated with each hole to engage and restrain each balancing weight from rotation in its hole.

2. A balancing assembly as claimed in claim 1 in which the means associated with each hole to engage and restrain each balancing weight from rotation in its hole includes a spring member extending across the radially inner end of each hole, each spring member having a pin extending into the hole parallel to but spaced from the axis of the hole and adapted to enter one of a plurality of drillings in the radially inner end of a balancing weight when it is screwed into its hole to restrain it from rotation in its hole.

3. A balancing assembly as claimed in claim 1 in which the annular member is secured to the inside surface of the rotor and lies parallel to a plane normal to the axis of rotation of the rotor, the rotor being provided with apertures co-axial with the holes in the annular member.

4. A balancing assembly as claimed in claim 1 in which each balancing weight is provided with an axial bore for the insertion of a tool to deflect the means restraining the weight from rotation in its hole and to thereby disengage the said means.

5. A balancing assembly as claimed in claim 1 in which each balancing weight is of a shape such that when it is in contact with the stop means, its centre of gravity is at a known distance from the axis of rotation of the rotor.

References Cited in the file of this patent

UNITED STATES PATENTS

| | | |
|---|---|---|
| 861,463 | Hyde | July 30, 1907 |
| 2,287,532 | Patterson | June 23, 1942 |
| 2,385,252 | Bennett | Sept. 18, 1945 |